MISSING CHARACTER DETECTOR

Filed Jan. 18, 1968

INVENTOR
J. J. J. KERNAHAN
BY Howard R Popper
ATTORNEY

MISSING CHARACTER DETECTOR

Filed Jan. 18, 1968 3 Sheets-Sheet 2

Nov. 10, 1970 J. J. J. KERNAHAN 3,539,992

MISSING CHARACTER DETECTOR

Filed Jan. 18, 1968 3 Sheets-Sheet 3

United States Patent Office
3,539,992
Patented Nov. 10, 1970

3,539,992

MISSING CHARACTER DETECTOR

John J. J. Kernahan, La Grange, Ill., assignor to Bell Telephone Laboratories, Incorporated, Murray Hill and Berkeley Heights, N.J., a corporation of New York Filed Jan. 18, 1968, Ser. No. 698,925
Int. Cl. G06f 11/10
U.S. Cl. 340—146.1 10 Claims

ABSTRACT OF THE DISCLOSURE

Circuitry is disclosed which checks the bit parity of characters obtained from a magnetic tape and which is responsive to the absence of a character within a block of such characters. The nominal time interval between characters on the tape is known and the receipt of a character from the tape causes the circuit to start timing the interval within which the next character should appear. If the next character does not appear within this interval, a parity failure indication is generated.

BACKGROUND OF THE INVENTION

This invention relates to the transmission of characters composed of binary bits and, more particularly, to detecting the absence of characters within a regularly spaced train of such characters.

When information characters are transmitted in a parallel fashion, it is highly desirable that the bits making up each of these characters arrive at their destinations as nearly simultaneously as possible. A timer is frequently provided to check the time of arrival of the bits of the characters. This timer may be started upon the receipt of the first bit of each of the transmitted characters and, at the end of the timed interval, the integrity, e.g., parity, of the bits of the character may be checked to insure that all the bits have properly arrived.

A problem with this approach stems from the fact that the actual arrival of the bits is required to take place before the parity of the character made up of the bits can be checked. If a character is missing, or is not detected, no indication of error can be generated. It would be a simple matter to incorporate an additional timer whose timed period is greater than the maximum time interval between characters. This timer could be started concurrently with the original timer and restarted at each subsequent detection of the first bit of a character. If this second timer times out, this indicates the failure of a character to arrive or be detected within the specified interval and an error indication for this condition can be generated.

A further problem arises, however, in transmitting the error indication. Many complex systems are presently designed with a single central control unit and several peripheral units. The central control unit acts as an administrative center and apportions the work to be done by the system among the several peripheral units. The economics of such a system dictates that communications between the central control unit and the peripheral units take place over a common bus system. This bus may take the form of a cable having a predetermined number of conductors connected to every peripheral unit and the central control unit. There are thus only a limited number of communication channels, determined by the number of conductors in the cable, between the peripheral units and the central control unit. The known number of conductors in the bus influences the design of all the units making up the system. Changing the capacity of the bus would thus involve a major change of all the hardware connected to the bus. Therefore, it is extremely undesirable to change the number of conductors in the bus cable to provide an additional indication from the peripheral magnetic tape recording unit to advise the central control unit of a missing character on a tape being read.

It is therefore an object of the present invention to detect the absence of a character in a regularly spaced train of characters.

It is a further object of this invention to indicate the absence of a character over an already existing communciation channel.

SUMMARY OF THE INVENTION

In accordance with this invention, apparatus is provided for indicating to a central control unit, over an existing communication channel, the absence of a character from a regularly spaced train of characters received by a peripheral unit. The received characters can come from a multitude of sources. They may, for example, be read from a magnetic tape, a magnetic disc or drum, a paper tape, or they may be transmitted over a plurality of wires. The mode of reception is immaterial, so long as the characters arrive at regular intervals.

The illustrative embodiments of this invention are shown in the environment of a stored program controlled electronic telephone switching system having a central control unit and a number of pheripheral units including an automatic message accounting tape unit connected to the central control unit via a peripheral bus. The central control unit transmits, via the peripheral bus, customer billing information to the tape unit, which writes this information on magnetic tape. In order to check that the information was properly written on the tape, the tape unit reads back what was written immediately after writing a block of the information and checks the parity of the characters making up the block. After the magnetic tape is filled, it is taken to the automatic message accounting center for processing so that customers can be billed for the calls they have made.

Normally, when the tape unit is reading back from the tape the information it has just written, the first bit of a character triggers in the parity check and indicator circuiry a first timer whose period is approximately one half of the intercharacter interval. At the end of this timed interval, all of the bits of the character should have been received and the parity check circuit is interrogated in order to indicate the integrity of the bits making up the character. If the parity check is proper, the parity check register containing the character is reset.

In accordance with an aspect of my invention, this same register may now be employed to check whether the next character arrives at the expected time. An additional timer is incorporated in the parity check and indicator circuitry. The added timer can be triggered either simultaneously with the first timer or at the end of the first timed interval. This timer times out after the first bit of the following character should have arrived. Since the parity check register had been reset after the receipt of the prior character, if no new character has arrived at this time an interrogation of the parity check circuit will result in a "parity failure" indication. I employ this forced parity failure indication to set a flip flop whose state can be ascertained by the central control unit over the peripheral bus in the same manner as a normal parity failure due to a missing bit, for example. Central control provided with this information may determine, in a manner not here relevant, whether there actually was a parity failure or whether no character was received. More importantly, however, central control has been informed that an error has occurred and remedial action can be initiated.

Accordingly, it is a feature of the present invention to transmit a signal indicating that a character in a stream of characters is missing by re-using the circuit which normally checks the parity of present characters at a time when it is detected that the particular character is absent.

Another feature of the present invention is a missing character detector in a peripheral magnetic tape recording unit which utilizes a timer to interrogate the parity checker at a time when it is known that parity will fail in order to indicate to a central control unit, over an existing communication channel, the absence of a character from a regularly spaced train of characters read from a magnetic tape.

DESCRIPTION OF THE DRAWING

The foregoing and other objects and features will become more apparent by referring now to the following detailed description together with the drawing, in which.

GENERAL DESCRIPTION

Figure 1:
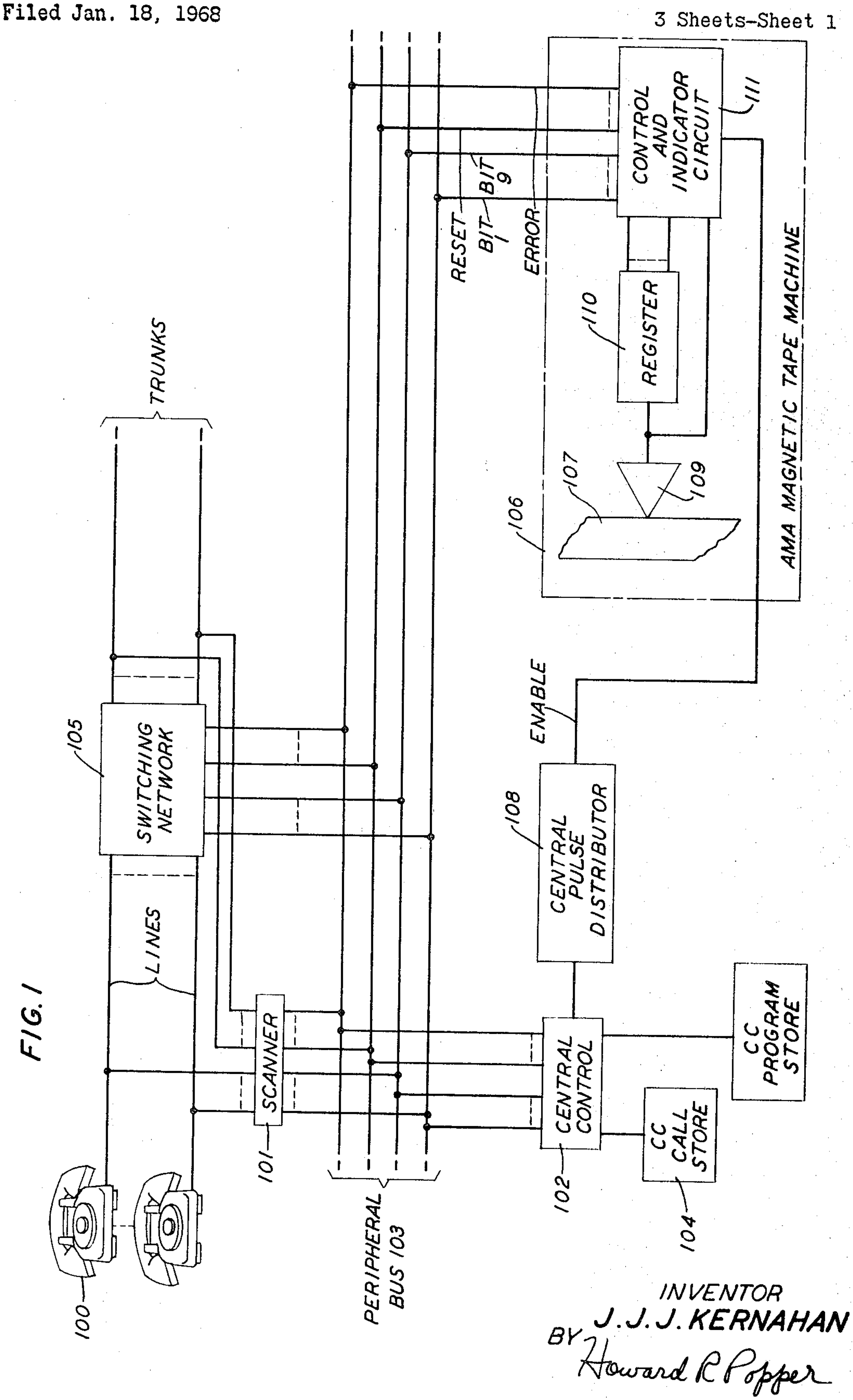
FIG. 1 shows an illustrative electronic telephone switching system in which the missing character indication signal derived in accordance with the principles of the present invention may be transmitted.

In FIG. 1 is shown an electronic telephone switching system which has an automatic message accounting magnetic tape machine as one of the peripheral units communicating with the central control unit over the peripheral bus. Only those units of the system which are essential to an adequate description of the immediate environment of the present invention, the tape machine, are shown in this diagram. The entire system is disclosed, for example, in "The Bell System Technical Journal," September 1964.

All communications between central control 102 and the peripheral units of the system take place over peripheral bus 103. Central pulse distributor 108 receives peripheral unit address information from central control 102 and enables, over direct connections (such as lead ENABLE) between the central pulse distributor and the peripheral units, only the particular peripheral unit with which central control 102 desires to communicate. Information can pass in both directions between central control 102 and the peripheral units over peripheral bus 103. A more detailed description of the peripheral bus system may be found in the above-cited reference.

When a subscriber desires to initiate a call, telephone station set 100, for example, is placed in the off-hook condition. Scanner 101 transmits the status of the line associated with station set 100 to central control 102, via peripheral bus 103. A path is set up by central control 102 through switching network 105. When a call is set up, central control 102 places customer billing information for that call in a special area of call store 104 reserved for customer billing information. When this area of memory is filled up with information from a predetermined number of calls, central control 102 transmits all this information, over peripheral bus 103, to AMA magnetic tape machine 106, which writes this information on magnetic tape 107.

This information transmitted to tape machine 106 over peripheral bus 103 is organized into blocks of 9-bit characters and the characters are written, by circuitry and write heads which are not shown, onto the tape at nominal 1 millisecond intervals. After each block of characters has been written, tape machine 106 reads a portion of this block from tape 107 to determine whether or not it was written correctly. The outputs of the heads and amplifiers 109 are transmitted to register 110 and also directly to control and indicator circuit 111. Control and indicator circuit 111 controls the writing of information on, and the reading of information from, tape 107 as well as checking the proper parity of characters read from the tape.

If any parity errors are detected, control and indicator circuit 111 notifies central control 102 over lead ERROR via peripheral bus 103. Central control 102 may only desire to record the fact that a failure has occurred, in which case no further action is taken in response to the indication on lead ERROR. However, central control 102 has the capability of ordering tape machine 106 to transmit to it, over leads BIT 1 through BIT 9 via peripheral bus 103, the last character stored in register 103. In this way, central control 102 can determine whether there actually was a parity failure or whether the indication signified that a character was not read from the tape in the expected time interval.

DETAILED DESCRIPTION

Figure 2:
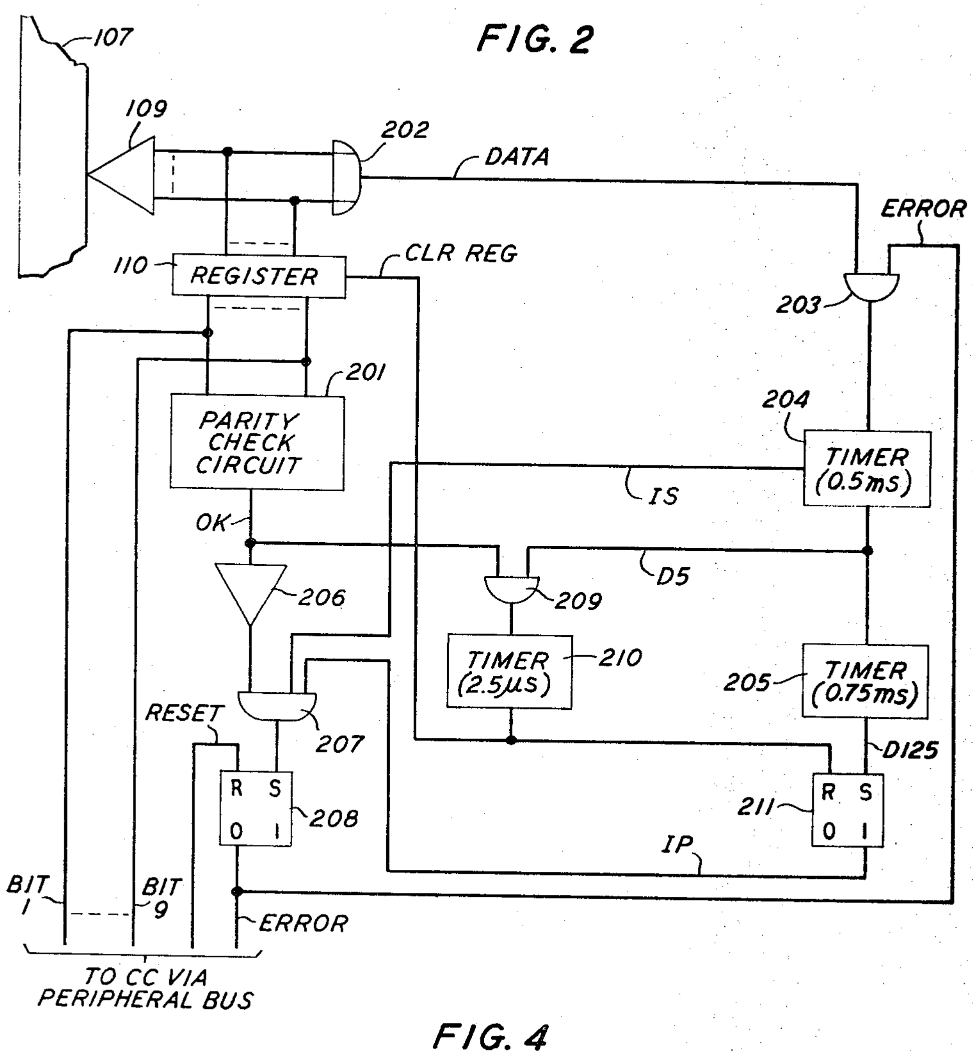
FIGS. 2 and 3 are block diagrams of alternative illustrative embodiments of the invention, either of which may be employed in the magnetic tape recording unit of the system of FIG. 1.

In FIG. 2 is shown one illustrative embddiment of the present invention. All of the circuit elements shown are well known in the prior art and no description will be given as to their individual operations. FIG. 2 should be studied in conjunction with FIG. 4 so that the time relationships are made clear.

The 9-bit characters are read from tape 107 at nominal 1 millisecond intervals by read heads and amplifiers 109 and are placed in register 110. Parity check circuit 201 examines the integrity of the bits in register 110 and gives a positive output on lead OK if the character displays odd parity, i.e., the character is made up of an odd number of binary "1."

The 9 bits read from the tape are also transmitted to OR gate 202 and gate 202 makes lead DATA positive whenever any bit of the character is presently being read. Asume for the present that lead ERROR is positive, so that AND gate 203 transmits a positive output whenever a character is read from tape 107. This causes timer 204 to commence timing a 0.5 millisecond interval. Timer 204 is arranged so that during this 0.5 millisecond interval lead IS is at a low potential. At the end of the 0.5 millisecond interval, a positive pulse is generated by timer 204 on lead D5 and timer 205 is triggered. Assuming that there is proper odd parity of the character in register 110, lead OK will be high and the output of inverter 206 will be low. Therefore, AND gate 207 will not transmit any signal and flip-flop 208 will not become set, keeping lead ERROR at a positive potential. Since lead OK is positive and there is a positive pulse on lead D5, AND gate 209 passes the positive pulse, which triggers timer 210. At the end of 2.5 microseconds, timer 210 generates a pluse on lead CLR REG, clearing register 110 and resetting flip-flop 211. Assuming that the next character appears on tape 107 at its appointed time, i.e., 1 millisecond after the previous character, timer 205 will not have yet generated an output when this next character is read from tape 107. When timer 205 completes timing the 0.75 millisecond interval, a pulse is generated on lead DD125 and flip-flop 211 is set. Lead IP becomes positive at this time. However, lead IS is negative because timer 204 is now timing the interval commencing with the arrival of the character which caused timer 205 to time the just completed interval, and AND gate 207 cannot pass any signal.

Assuming that characters are read from tape 107 at regular 1 millisecond intervals, the only time that leads IS and IP are simultaneously positive is for a 2.5 microsecond interval beginning 0.5 millisecond after receipt of the first bit of a character. During this interval, all the bits of the character should be stored in register 110 and lead OK should be positive. If lead OK is not positive, indicating improper parity, all the inputs of AND gate 207 are high and the output of AND gate 207 causes flip-flop 208 to be set. The change of potential on lead ERROR notifies central control 102 of this condition.

Figure 4:
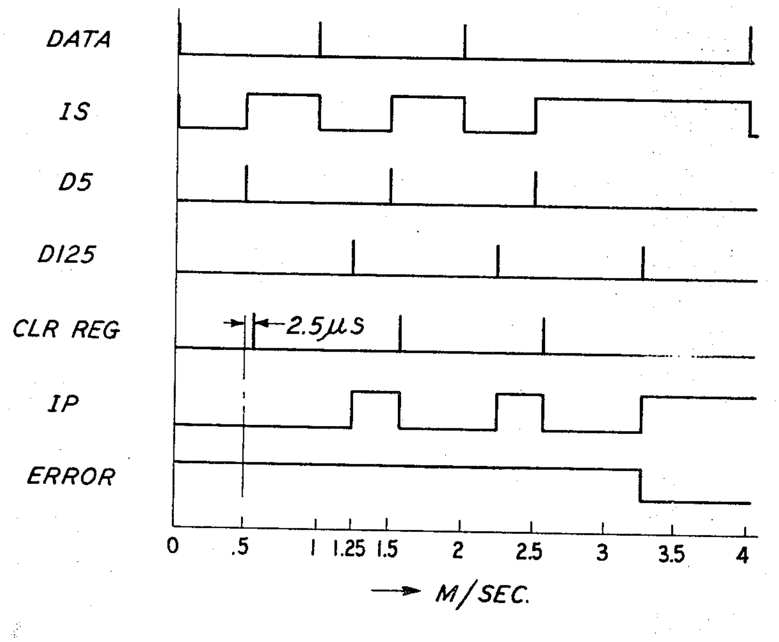
FIGS. 4 and 5 show the timing relationship among the elements of the circuits of FIGS. 2 and 3, respectively.

Suppose, however, that a character is not detected or is missing. Register 110 having been cleared after the previous character, parity check circuit 201 generates a low output on lead OK, which manifests itself as a positive output from inverter 206. Lead IS is at a positive potential because timer 204 has not been triggered. Timer 205 is still timing the 0.75 millisecond interval which commenced 0.5 millisecond after the arrival of the previous character and will not give an output on lead D125 until 1.25 milliseconds after the arrival of the previous character. When timer 205 gives an output on lead D125, flip-flop 211 is set and lead IP goes positive. Reference to FIG. 4 will show that all the inputs to AND gate 207 are positive, and the subsequent output from AND gate 207 sets flip-flop 208.

A change in potential on lead ERROR notifies central control 102 either that parity has failed or else a character is lacking. Central control 102 keeps track of all the malfunctions reported to it via peripheral bus 103 by a change in potential of lead ERROR, and at this point it can order tape machine 106 to transmit to it, over leads BIT 1 through BIT 9 via peripheral bus 103, the contents of register 110. If register 110 contains a character then central control 102 knows that a parity failure has occurred in this character. If register 110 is blank, a character was not read from tape 107 within the expected interval.

Although not shown in FIG. 2, lead ERROR goes to other points within control and indicator circuit 111 in order to inhibit various operations of tape machine 106 when a malfunction has been detected. After central control 102 has diagnosed the malfunction to its satisfaction, a proper signal is sent out by central control 102 over peripheral bus 103 on lead RESET to tape machine 106. This signal resets flip-flop 208 and allows tape machine 106 to continue its operation.

Figure 3:
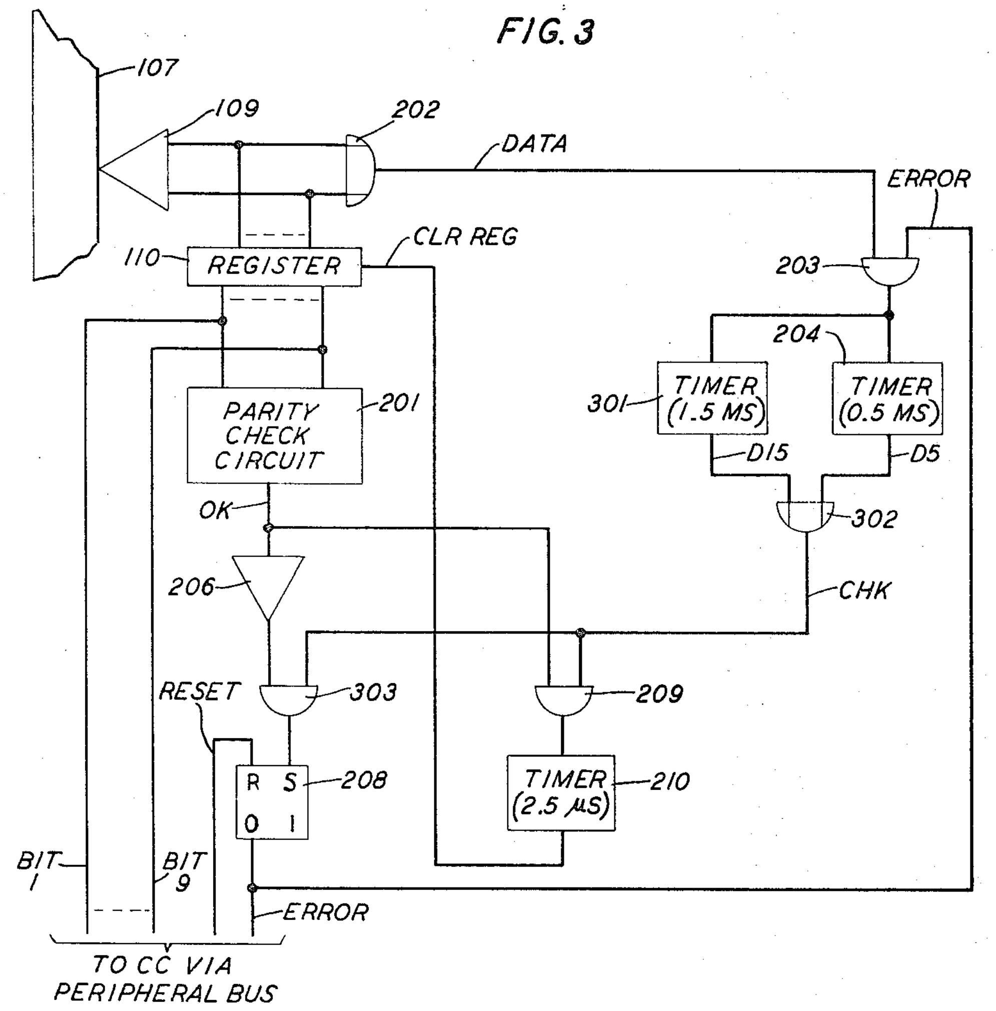

An alternate embodiment of this invention is shown in FIG. 3. The operation of this embodiment is simpler and more easily understood than that of the embodiment of FIG. 2. Much of the operation is similar to that previously described and all of the circuit elements shown are known in the prior art. Therefore, a description will only be given for the differing portions of the operation. FIG. 3 should be studied in cojunction with FIG. 5 so that the time relationships are more clearly set forth.

Figure 5:
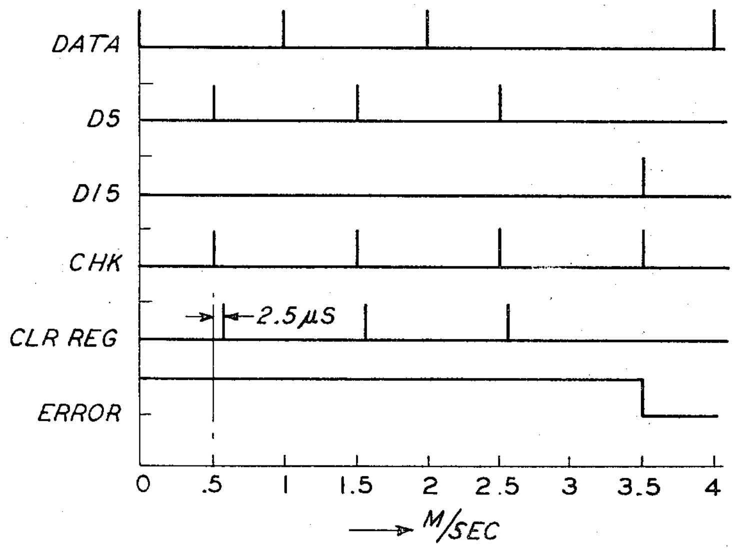

Whenever a character is read from tape 107, lead DATA becomes positive and, assuming lead ERROR is positive, timers 204 and 301 are triggered. When timer 204 times out, 0.5 millisecond after it is triggered, a positive pulse is generated on lead D5. Lead CHK, the output of OR gate 302, transmits this positive pulse to the inputs of AND gates 209 and 303. Assuming a proper parity check of the character in register 110, flip-flop 208 is not set and an output on lead CLR REG 2.5 microseconds after the pulse on lead CHK clears register 110. If no characters are missing and parity is proper, there will be a succession of pulses at 1 millisecond intervals at the output of AND gate 203. Each pulse will cause timer 204 to commence timing a 0.5 millisecond interval and will also cause timer 301 to commence timing a 1.5 millisecond interval. Timer 301 is arranged so that if a pulse appears at its input, no output will be generated until the 1.5 millisecond interval commencing with that pulse is over, negating the result of any previous input pulse which has not yet resulted in an output. Thus, as long as pulses keep appearing at the input to timer 301 at 1 millisecond intervals, timer 301 will not generate any output on lead D15. However, if a pulse is missing, corresponding to the absence of a character, timer 301 will generate an output pulse on lead D15 1.5 milliseconds after the last character was detected. Reference to FIG. 5 discloses this condition. The output pulse on lead D15 is transmitted through OR gate 302 and over lead CHK to the input of gate 303. Since register 110 has been cleared by the operation of the circuit in response to the last character, parity check circuit 201 will give a low output indication on lead OK. The output of inverter 206 will therefore be positive and since there is a positive pulse on lead CHK at the other input of AND gate 303, AND gate 303 will pass the positive pulse to set flip-flop 208, thereby changing the potential on lead ERROR.

Thus, in accordance with my invention, missing characters are detected and the control circuitry alerted by using existing parity checking arrangements and the existing leads of the peripheral bus to the control circuitry. Specifically, in accordance with an aspect of my invention, in both the embodiment of FIG. 2 and that of FIG. 3, I force the logic circuitry including the parity check circuit 201 to indicate the parity of the information stored in the register 110 when the timer circuitry has established that no information has been stored in the register and thus the parity check will fail. Thus my character failure signal is a failure of parity because the register 110 has priorly been cleared of the immediately previous character and no new character has been stored.

It is understood that the above-described arrangements are merely illustrative of the application of the principles of this invention. Numerous other arrangements may be devised by those skilled in the art without departing from the spirit and scope of this invention.

What is claimed is:

1. A circuit for indicating the absence of a character from a train of characters, the characters of said train being separated from each other by a predetermined interval, comprising:

detector means operative responsive to the first bit of any of said characters;

register means for storing said any of said characters;

parity check means for checking the integrity of the contents of said register means;

first and second timer means responsive to the operation of said detector means, said first timer means timing a first interval less than said predetermined interval and said second timer means timing a second interval greater than said predetermined interval; and means controlled by said first timer means for ascertaining the state of said parity check means and for clearing said register means and responsive to said second timer means for ascertaining the state of said parity check means after the end of said predetermined interval;

said second timer means being prevented from effecting operation of said last mentioned means upon detection of another bit.

2. The circuit of claim 1 wherein said second timer means comprises said first timer means and a further timer means in series therewith, said further timer means responsive to the output of said first timer means for timing a third interval equal in time to the difference between said second interval and said first interval.

3. The circuit of claim 2 wherein said second interval is less than said predetermined interval plus said first interval and further including means operative during said first interval so that said ascertaining means is prevented from responding to said second timer means whenever a bit of a character is detected.

4. The circuit of claim 1 wherein said first and second timer means are in parallel and said detector means causes said second timer means to recommence timing said second interval upon each initiation of timing of said first timing means so that said second timer means does not produce an output if said detector means operates before said second timer means produces an output.

5. A circuit for indicating the absence of a character in a stream of transmitted data bit characters comprising:

means for detecting the presence of a bit belonging to one of said characters;

registers means for storing said one of said characters;

parity check means responsive to the operation of said detecting means for checking the parity of said one of said characters in said register means;

means responsive to the operation of said parity check means for clearing said register means;

a timer responsive to the operation of said detecting means for timing an interval recommencing with each operation of said detecting means; and means responsive to said timer timing out in the absence of the operation of said detector means for causing said parity check means to operate again whereby the absence of a character following said one of said characters in said register means causes said parity check means to indicate improper parity.

6. A circuit for detecting missing characters in a stream of periodically transmitted data bit characters comprising:

parity check means;

means for detecting the presence of a bit of a character in said stream;

timer means for timing an interval longer than the period between said periodically transmitted characters;

means responsive to the output of said detecting means for causing said parity check means to check the parity of said character and also to operate said timer means; and means responsive to the output of said timer means to cause said parity check means to operate again in order to induce parity failure when a character does not arrive within said interval following the arrival of a previous character.

7. A circuit in accordance with claim 6 further comprising means responsive to said detecting means detecting a bit of the next character in said stream for preventing said timer means for reoperating said parity check means.

8. A circuit in accordance with claim 6 wherein said parity check means includes a register, means for inserting the bits of a character in said register, means for checking parity on the bits in said register, and means for resetting said register to contain all zeroes after each check of the parity of the bits inserted in said register.

9. A method for indicating the absence of a character from a regularly spaced train of characters comprising the steps of:

(1) storing a representation of each arriving character in a machine register;

(2) generating first and second timing signals in response to said storing, the first signal terminating before the next expected arrival of a character and the second signal terminating after the next expected arrival;

(3) checking the parity at the termination of said first signal to indicate the integrity of the contents of said register;

(4) clearing said register; and (5) checking the parity of said cleared register and indicating a parity failure at the termination of said second signal if no character arrived before the termination of said second signal.

10. A method for indicating the absence of a character from a regularly spaced train of characters comprising the steps of:

(1) detecting the arrival of a character;

(2) storing a representation of the arrived character in a machine register;

(3) starting a timer in response to said detecting, said timer timing an interval greater than the expected interval between said characters;

(4) checking the parity of the contents of said register;

(5) clearing said register; and (6) checking again the parity of the contents of said register when said timer has timed out in the absence of any further detection of an arrived character.

References Cited

UNITED STATES PATENTS

| | | | |
|---|---|---|---|
| 2,948,884 | 8/1960 | Guerber et al. | 340—174.1 |
| 3,142,829 | 7/1964 | Comstock | 340—174.1 |
| 3,193,812 | 7/1965 | Friend | 340—174.1 |

MALCOLM A. MORRISON Primary Examiner

C. E. ATKINSON, Assistant Examiner

U.S. Cl. X.R.

235—153; 340—174.1